P. B. CRANE.
DEEP TILLING GANG PLOW.
APPLICATION FILED NOV. 28, 1913.
1,179,899.
Patented Apr. 18, 1916.
2 SHEETS—SHEET 1.
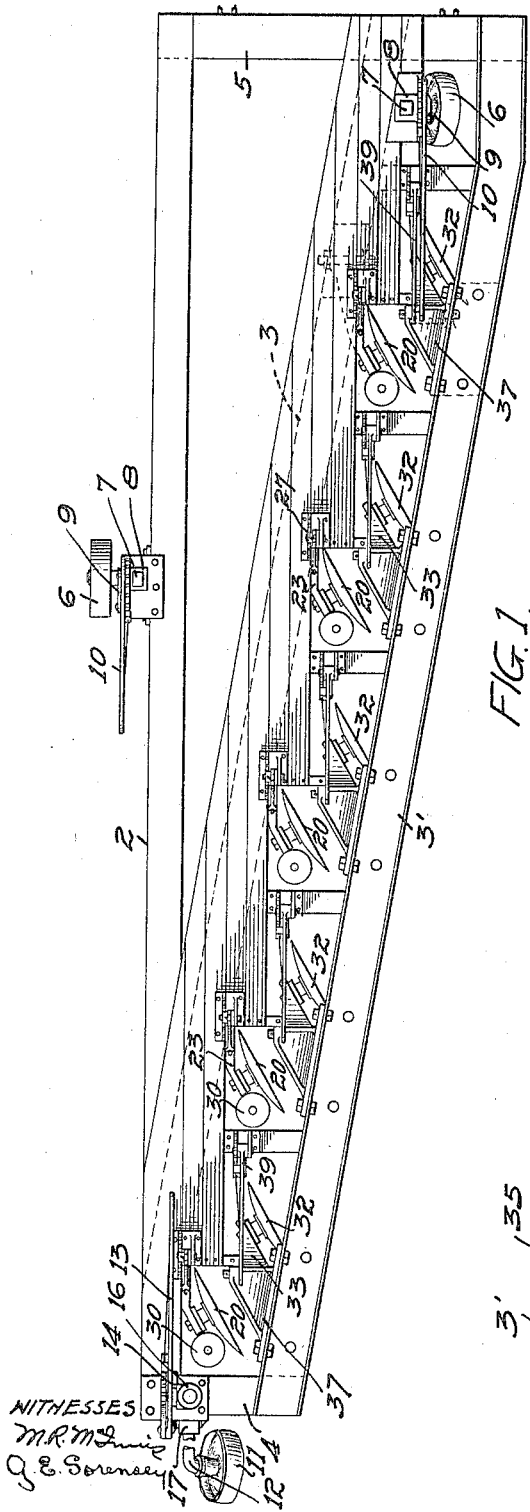
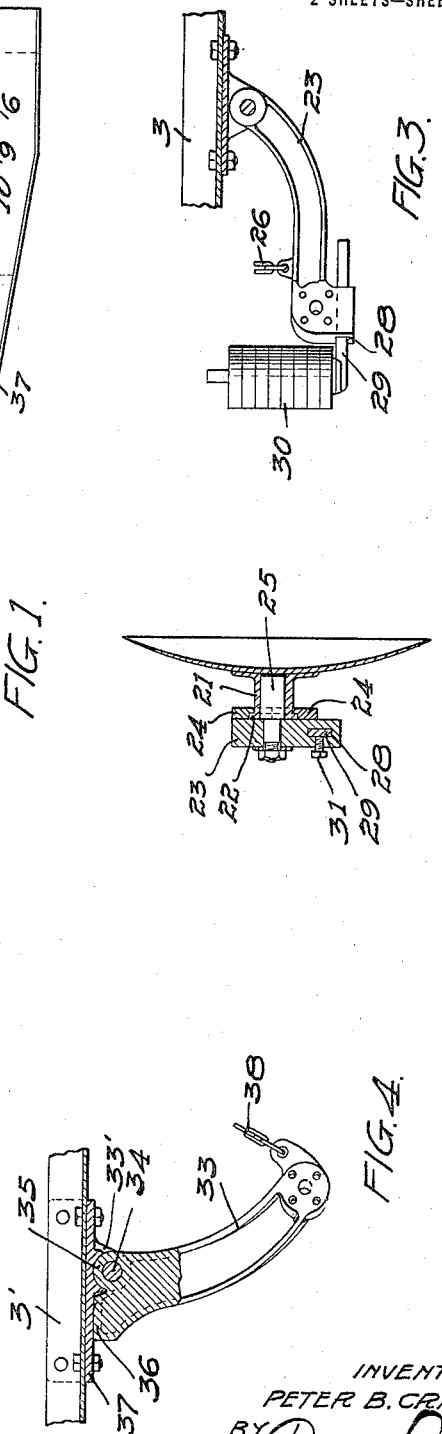
INVENTOR
PETER B. CRANE
BY
ATTORNEYS

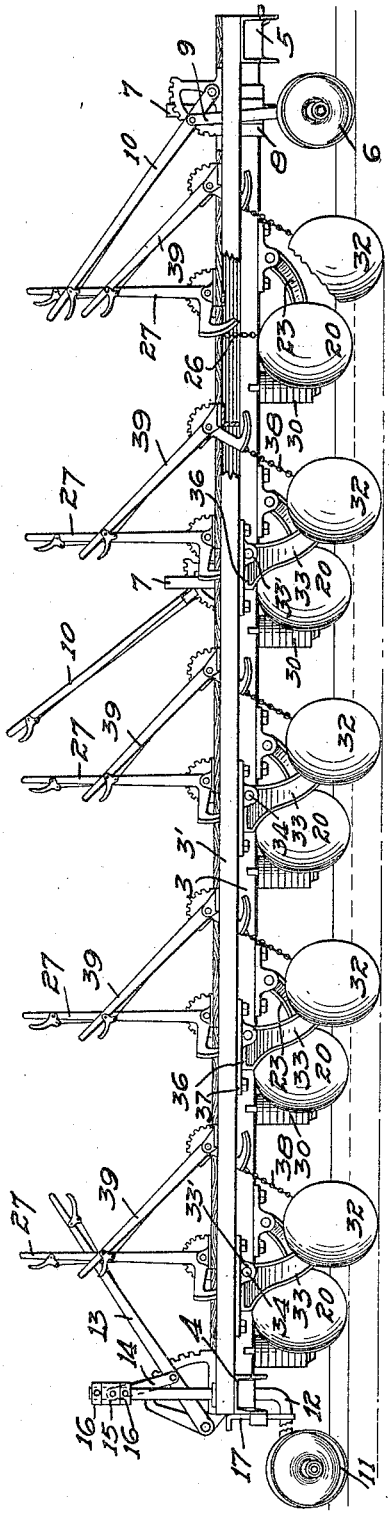

UNITED STATES PATENT OFFICE.

PETER B. CRANE, OF LONG LAKE, MINNESOTA, ASSIGNOR TO C. D. FOLLANSBEE, OF LONG LAKE, MINNESOTA.

DEEP-TILLING GANG-PLOW.

1,179,899.  Specification of Letters Patent.  Patented Apr. 18, 1916.

Application filed November 28, 1913. Serial No. 803,532.

*To all whom it may concern:*

Be it known that I, PETER B. CRANE, citizen of the United States, resident of Long Lake, Hennepin county, Minnesota, have invented certain new and useful Improvements in Deep-Tilling Gang-Plows, of which the following is a specification.

The object of my invention is to provide a gang plow by means of which the soil can be turned to a considerable depth, the plows being arranged so that those of one group will travel in the furrow previously cut by the other group.

A further object is to provide a plow which can be easily operated and is thoroughly efficient for the purpose designed.

The invention consists generally in various constructions and combinations, all as hereinafter described and particularly pointed out in the claims.

In the accompanying drawings forming part of this specification, Figure 1 is a plan view of a gang plow embodying my invention, Fig. 2 is a side elevation, partially in section, of the same, Fig. 3 is a detail sectional view of a beam of one of the groups of beams, Fig. 4 is a similar sectional view, showing the other type of beam, Fig. 5 is a detail sectional view, showing the preferred manner of mounting the plow disk on the beam.

In the drawing, 2, 3 and 3' represent the side and middle rails of the frame, and 4 and 5 the end rails thereof. At the forward end of the frame is a carrying wheel 6, mounted on an arm 7 that is vertically adjustable in a bearing 8 on said frame and operated by means of a link 9 and a lever 10, this being ordinary construction in machines of this type. A side carrying wheel, corresponding to the one shown in front, is also provided and mounted in a similar manner, and which I will indicate by the same reference numerals. The rear end of the machine has a carrying wheel 11 supported on an arm 12 that is vertically slidable in the frame of the machine and is operated by means of a lever 13 having a link 14 connecting said lever with a sleeve 15 between two collars 16 on said arm. A fork device 17 is mounted on said frame and normally prevents the arm from turning in its bearing. The arm 12 is free to rotate in its bearing, as well as having a sliding movement therein, while the arms 7 fitting within rectangular sockets are held against rotary movement.

A group of disks 20 are provided for making the initial cut or furrow in the soil. These disks are arranged one in advance of the other and offset to make a corresponding number of furrows. Each of these disks is provided with a hub 21 in its convex face, provided at one end with an annular flange 22 that is held against the beam 23 of the disk by means of flanged plates 24. A stud 25 is mounted in the beam and has a bearing for the hub 21. The forward end of the beam is pivotally connected with the rail 3 of the frame, said rail being diagonally arranged at an angle to the direction of movement of the machine, and provided for the proper offset of the plows with respect to one another. The beams are free to oscillate vertically on their pivotal connections with the frame and each beam has a flexible connection, such as a chain 26, connecting it with an operating lever 27 mounted on the machine frame. By means of this lever each disk can be raised or lowered, independently of all the other disks.

Each beam 23 is provided with a socket 28 in which the horizontal arm of a bracket 29 is slidable. This bracket has an upright arm upon which a series of weights 30 are placed, one above another. A set screw 31 is mounted in the beam 23 in position to engage the bracket 29 and lock it on the beam. When this set screw is loosened, the bracket may be moved toward or from the pivot of the disk and the leverage of the weights thereon increased or diminished, as desired. The other group of disks 32 are pivotally mounted on beams 33 supported between depending lugs 33' by means of pins 34 which pass through hubs 35 provided on the upper ends of said beams at the forward portions thereof. In the rear of each hub is a shoulder 36 which engages the underside of a plate 37 on which the lugs 33' are formed, thereby limiting the backward oscillation of said beams but allowing them to swing upwardly and forwardly to raise the disks out of the ground and pass over any obstruction therein without interfering with the movement of the other disks. The plate 37 has a concave under surface which bears on the hub 35 so that the load on the disk is transmitted through its supporting beam without any tendency to shear the pivot pin 34. The pivots of the beams 34 are, as shown, in the rear of the pivots of the disks thereon, and the shoulders 36 engaging the plate 37 will limit the backward oscillation of said beams, while the forward movement of the machine will tend to push the disks 23 into the soil and complete the depth of cut of the furrow. The hub 35 has a long bearing on the pin 34 and with the concave face of the plate 37 will form a substantial, durable bearing for the disk supporting beam on the frame of the machine. This I have found a simple and economical method of mounting the push beams on the frame, as the parts are few in number and easily accessible for substitution or repairs.

Flexible means, such as the chains 38, are attached to the lower ends of the beams 33 and to operating levers 39 mounted on the frame of the machine. These push beams 33 may be lifted by the operation of the levers 39 to regulate the depth of cut of the disks carried thereby and, if desired, the machine may be weighted to force these disks a greater depth into the soil. I do not, however, depend upon weights for depressing the disks 32, as the forward draft of the machine will have a tendency to make these disks dig into the soil without the aid of weights, usually required where the pivot of the beam is in advance of the disk.

In the operation of the machine, the disks 20 are set to cut a series of shallow furrows and the disks 32 following after the disk 20 and in slightly staggered relation with respect thereto will deepen the cut of the furrows, the depth being regulated by the levers controlling the adjustment of the beams 33. The forward disk 32 may be set to cut a deep or shallow furrow, as desired, on the first time around the field, and on the second time around may travel in the furrow previously cut by the rear disk 20.

In various ways the details of construction herein shown and described may be modified and still be within the scope of my invention.

I claim as my invention:

1. A deep soil gang tilling machine comprising a frame having carrying wheels, a series of beams pivotally connected to said frame, a series of disks mounted on said beams, the pivots of said beams on said frame being in the rear of the centers of said disks, whereby upon the forward movement of said frame said beams will operate to push said disks into the soil, said disks being free to rise and fall in the soil during the operation of the machine, and means for regulating the depth of cut of said disks.

2. A gang tilling machine comprising a frame having carrying wheels, beams pivotally connected with said frame, a series of disks mounted on said beams, the pivots of said beams on said frame being in the rear of the centers of said disk, whereby said beams will operate to push said disk into the soil during the forward movement of the machine, operating levers, and flexible means connecting said beams with said levers for regulating the depth of the cut of said disks, said flexible means allowing said disks to rise and fall in the soil during the operation of the machine.

3. A gang tilling machine comprising a frame having carrying wheels, beams pivotally connected at the forward portion of their upper ends on said frame and having stops in the rear of said pivots to limit the backward oscillation of said beams, disks mounted on said beams in advance of their pivots on said frame, said beams operating to push said disks into the soil with the forward movement of said frame.

4. A gang tilling machine comprising a frame having carrying wheels, plates secured to the underside of said frame and having depending lugs provided with concave bearing surfaces between said lugs, beams having hubs thereon to engage said bearing surfaces, pins passing through said hubs and lugs and pivotally connecting said beams with said frame, disks mounted on said beams in advance of their pivotal connections with said frame, whereby the weight of said frame will be transmitted through the said beams to push said disks into the soil, and means for regulating the depth of cut of said disks.

5. A gang tilling machine comprising a frame having carrying wheels, beams pivotally connected with said frame, disks mounted on said beams, the pivots of said beams on said frame being in the rear of the centers of said disks, whereby upon the forward movement of said frame said beams will operate to push said disks into the soil, said disks being free to rise and fall in the soil during the operation of the machine.

6. A gang tilling machine comprising a frame having carrying wheels, beams mounted to move vertically on said frame, disks mounted on said beams in front of their bearings on said frame, the forward movement of said frame operating to exert a longitudinal pressure on said beams to force said disks into the soil, said disks being free to rise and fall in the soil during the operation of the machine, and weights supported on said beams for increasing or decreasing the pressure on said disks.

7. A gang tilling machine comprising a frame having carrying wheels, beams pivotally connected with said frame, disks carried by said beams, said beams and disks being arranged in pairs, the mounting of one beam of a pair on said frame exerting a pulling action on said beam and the mounting of the other beams of the same pair on said frame exerting a pushing action thereon.

In witness whereof, I have hereunto set my hand this 20th day of November, 1913.

PETER B. CRANE.

Witnesses:
GENEVIEVE E. SORENSEN,
EDWARD A. PAUL.

Copies of this patent may be obtained for five cents each, by addressing the "Commissioner of Patents, Washington, D. C."